United States Patent [19]

Niemi

[11] B 3,989,666
[45] Nov. 2, 1976

[54] CROSSLINKER-PLATINUM CATALYST-INHIBITOR AND METHOD OF PREPARATION THEREOF
[75] Inventor: Randolph G. Niemi, Midland, Mich.
[73] Assignee: Dow Corning Corporation, Midland, Mich.
[22] Filed: Dec. 2, 1974
[21] Appl. No.: 528,962
[44] Published under the second Trial Voluntary Protest Program on February 24, 1976 as document No. B 528,962.

[52] U.S. Cl. .................. 260/46.5 UA; 252/429 R; 252/430; 260/46.5 G; 260/825
[51] Int. Cl.² .......................................... C08G 77/04
[58] Field of Search ............. 252/429 R, 430; 260/429 R, 46.5 UA, 46.5 G, 825

[56] References Cited
UNITED STATES PATENTS 3,445,420  5/1969  Kookootsedes et al. ............... 260/37
3,715,334  2/1973  Karstedt ..................... 260/46.5 UA Primary Examiner—Lewis T. Jacobs
Attorney, Agent, or Firm—Roger H. Borrousch

[57] ABSTRACT

A crosslinker-platinum catalyst-inhibitor is prepared by heating in a closed system for 10 to 30 hours at 50° C. to 90° C. a mixture of a siloxane having at least three silicone-bonded hydrogen atoms, an acetylenic alcohol and a platinum catalyst and then removing the unreacted acetylenic alcohol at reduced pressure and 20° C. to 30° C., a complex product is obtained which when combined with a vinyl containing siloxane polymer has an extended shelf-life but can be cured by heating. The complex product functions as a crosslinker, a catalyst and an inhibitor which retards the reactions of silicon-bonded hydrogen atoms with aliphatic unsaturation catalyzed by platinum.

20 Claims, No Drawings

CROSSLINKER-PLATINUM CATALYST-INHIBITOR AND METHOD OF PREPARATION THEREOF

Background of the Invention

1. Field of the Invention

This invention relates to a siloxane composition which is a crosslinker, a platinum catalyst and an inhibitor combination and the method of its preparation.

2. Description of the Prior Art

The inhibition of platinum catalyst by acetylenic materials is known in the art from U.S. Pat. No. 3,445,420 issued May 20, 1969 to Gust J. Kookootsedes and Edwin P. Plueddemann. The compositions described by Kookootsedes et al. are curable and comprise an aliphatically unsaturated organosilicon polymer, an organosilicon compound having silicon-bonded hydrogen atoms, a platinum catalyst and an acetylenic compound. These compositions remain uncured over extended periods of time at room temperature, but will cure in short time periods when they are heated. The presence of the acetylenic compounds inhibits the platinum catalyst from catalyzing the curing reaction at room temperature but not at elevated temperature. The usefulness of such compositions have been demonstrated and permits the shipping of one package compositions instead of two package compositions. Also such compositions can be used to extend the working time or pot life compared to compositions not containing the acetylenic compound.

However, certain problems are encountered when the acetylenic compounds are used. One problem is that the acetylenic compounds have sufficient volatility to require their storage in carefully sealed containers to prevent the evaporation of the acetylenic inhibitor. In addition, compositions, which contain these volatile acetylenic inhibitors, cure with the formation of a wrinkled surface. The particular class of acetylenic inhibitors which show these problems are the acetylenic alcohols.

SUMMARY OF THE INVENTION

An object of this invention is to provide a method for preparing a crosslinker-platinum catalyst-inhibitor composition, the resulting composition and curable compositions made therefrom.

This invention relates to a method of preparing a crosslinker-platinum catalyst-inhibitor by heating in a closed system a mixture of siloxane having silicon-bonded hydrogen atoms, an acetylenic alcohol and a platinum catalyst. The unreacted acetylenic alcohol is removed by reduced pressure and the resulting product functions as a non-volatile inhibitor for platinum catalized reactions at room temperature but allows rapid cure at elevated temperatures, as a crosslinker for aliphatically unsaturated siloxane polymers and as a platinum catalyst which promotes the addition reaction between aliphatically unsaturated compounds and silicon-bonded hydrogen atoms. This invention also relates to the crosslinker-platinum catalyst-inhibitor compositions prepared by the above method and to curable compositions using said crosslinker-platinum catalyst-inhibitor composition.

DESCRIPTION OF THE INVENTION

This invention relates to a method of preparing a crosslinker-platinum catalyst-inhibitor composition comprising mixing a siloxane having an average of at least three silicon-bonded hydrogen atoms per molecule, an acetylenic alcohol and a platinum catalyst to form a mixture, heating the mixture in a closed system for 10 to 30 hours at a temperature of from 50°C. to 90°C. and thereafter removing unreacted acetylenic alcohol by applying a reduced pressure of 700 to 750 millimeters of mercury for at least 10 hours at a temperature of from 20°C. to 30°C., said siloxane having an average of at least three silicon-bonded hydrogen atoms per molecule, there being in addition an average of up to two monovalent organic radicals per silicon atom selected from the group consisting of monovalent hydrocarbon radicals free of aliphatic unsaturation and monovalent fluorinated hydrocarbon radicals free of aliphatic unsaturation, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent fluorinated arylene radicals wherein at least one divalent radical is a divalent oxygen atom and said divalent radicals linking silicon atoms, said siloxane being liquid at a temperature of 50°C. to 90°C. and in said mixture, said acetylenic alcohol having a vapor pressure sufficient to be removed from the mixture after the heating step at the temperature and pressure specified for the removal of unreacted acetylenic alcohol.

A mixture of a siloxane having at least three silicon-bonded-hydrogen atoms, an acetylenic alcohol and a platinum catalyst is heated in a closed system at a temperature of 50°C. to 90°C., preferably at 60°C. to 80°C., for 10 to 30 hours, preferably from 12 to 20 hours. The closed system should be such that there is at all times during the heating period sufficient acetylenic alcohol in intimate contact with the siloxane and platinum catalyst. A heating period of less than 10 hours is insufficient to provide a product which is significantly different than the mixture of starting materials at room temperature. Above 30 hours of heating, any change in resulting product are insignificant and although one could use longer times no significant change in product is apparent. The heating temperatures below 50°C. do not provide any significant change in the mixture over extended time periods, such as a week or more. The longer time periods, such as 20 to 30 hours are usually required for mixtures heated at 50°C. to 60°C. and shorter heating periods, such as 10 to 20 hours are sufficient for mixtures heated at 70°C. to 90°C. Above 90°C., the problem of gellation occurs and is not readily controllable. Additionally, the reaction can react violently when heated to higher temperatures.

After the heating period for the mixture is completed, the resulting product could be used in the form obtained, however, there remains a considerable amount of unreacted acetylenic alcohol and thus the problems of volatility and wrinkling mentioned above would not be resolved. Therefore, the unreacted acetylenic alcohol is removed by reduced pressure of 700 to 750 millimeters of mercury and at a temperature relatively close to room temperature, 20°C. to 30°C. Lower temperatures could be used but the removal is too slow to be practical and temperatures higher than 30°C. lead to gellation problems. The removal of the acetylenic alcohol should be carried out for at least 10 hours and there is no upper limit to this time period because practical and economical factors will control. After a certain amount of time, such as 20 to 40 hours, for all practical purposes the unreacted acetylenic alcohol has been removed. The pressure should not be reduced below about 700 millimeters of mercury because other useful species of the reaction product will also be removed at pressures below 700 millimeters of mercury.

There are certain combinations of siloxane having silicon-bonded hydrogen atoms, acetylenic alcohol and platinum catalyst which can be used as obtained after the heating period without removing the unreacted acetylenic alcohol. Such combinations can be obtained by using a given siloxane having silicon-bonded hydrogen atoms and platinum catalyst and varying the concentration of a given acetylenic alcohol until an elastomer prepared therewith fails to show surface wrinkling. The determination of the proper concentrations is easily performed as illustrated in the examples. Unstripped crosslinker-platinum catalyst-inhibitor compositions of this type can be prepared to avoid the wrinkling problem, but one tends to sacrifice storage stability. However, the elimination of the stripping of unreacted acetylenic alcohol can be a savings in energy, time and money. If one can operate at the reduced storage times, elimination of the stripping step is a real advantage. For long storage, the stripping step should be used.

The siloxanes having an average of at least three silicon-bonded-hydrogen atoms per molecule are known to the art and many are available commercially. The siloxanes can include homopolymers, copolymers or mixtures of two or more of the foregoing. The siloxane can contain, in addition to the silicon-bonded hydrogen atom, up to two monovalent radicals per silicon atom. These monovalent radicals can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl; monovalent fluorinated hydrocarbon radicals such as 3,3,3-trifluoropropyl, α,α,α-trifluorotolyl, β-(perfluoroethyl)ethyl and β-(perfluoropentyl)ethyl. The remaining valences of the silicon atoms are satisfied from divalent oxygen atoms, divalent hydrocarbon radicals free of aliphatic unsaturation such as
—CH₂—,   —(CH₂)₁ₐ—,   —CH₂CH(CH₃)—,
—CH₂C(CH₃)₂—,

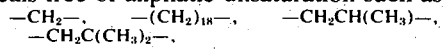, 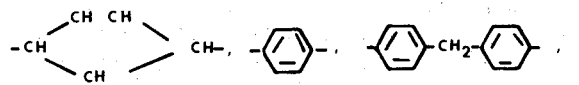

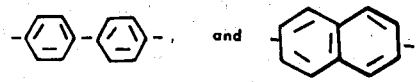

divalent hydrocarbon ether radicals free of aliphatic unsaturation such as
—CH₂CH₂OCH₂CH₂—, —CH₂CH₂CH₂OCH₂CH₂—,

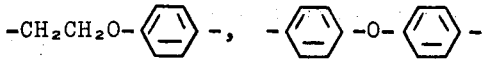

and divalent fluorinated arylene radicals such as

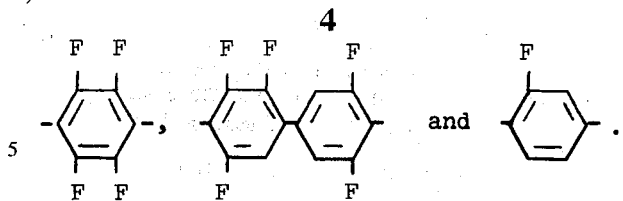

Any one or more of the above divalent radicals can link the silicon atoms, however, there is at least one divalent oxygen atom per molecule and preferably at least 50 percent of the divalent radicals are divalent oxygen atoms. Examples of the above defined siloxanes can be found in U.S. Pat. No. 3,445,420 and U.S. Pat. No. 3,453,234 which are hereby incorporated by reference to show siloxanes having an average of at least three silicon-bonded-hydrogen atoms.

The acetylenic alcohol can be any of those described in U.S. Pat. No. 3,445,420 which is hereby incorporated by reference to show acetylenic alcohols. Examples of the acetylenic alcohols, include, 3-methyl-1-butyn-3-ol, 3-phenyl-1-butyn-3-ol, 1-ethynylcyclohexane-1-ol, 3,5-dimethyl-1-hexyn-3-ol and 3-methyl-1-pentyn-3-ol.

The platinum catalysts are well known in the art and can be any of those known to promote the reaction between aliphatic unsaturation and silicon-bonded-hydrogen atoms. Examples of platinum catalysts can include, chloroplatinic acid hexahydrate or the anhydrous form, platinum deposited on a carrier such as silica, alumina or charcoal, platinous halides, complexes of platinous halides with olefinic compounds including olefinic silicon compounds, other platinum complexes and platinum salts. These and other platinum catalysts are described in U.S. Pat. No. 3,453,234 which is hereby incorporated by reference to show platinum catalysts.

The amount of siloxane having an average of at least three silicon-bonded-hydrogen atoms per molecule, the amount of platinum catalyst and the amount of acetylenic alcohol used to make the mixture for this invention can vary broadly, but each should be present in sufficient amounts to provide the function for which it is used. For example, the siloxane should be present in amounts sufficient enough to be useful as a crosslinker, the platinum catalyst should be present in amounts sufficient to be catalytic and the acetylenic alcohol should be present in amounts sufficient to form a reaction product which inhibits the platinum catalyst at room temperature. The preferred amounts are from 85 to 99 weight percent siloxane having an average of at least three silicon-bonded-hydrogen atoms, and from 0.5 to 15 weight percent of acetylenic alcohol wherein the weight percentages are based on the combined weight of siloxane, acetylenic alcohol and platinum catalyst. The platinum catalyst is preferably present in an amount to provide from 20 to 250 parts by weight platinum per million parts by weight of total mixture. The most preferred mixtures are those which contain from 90 to 95 weight percent of said siloxane, from 3 to 9.5 weight percent acetylenic alcohol and from 25 to 150 parts by weight platinum per million parts by weight total mixture. The most preferred mixtures provide reaction products which when used to make compositions containing aliphatically unsaturated siloxanes remain stable at room temperature for times of greater than 4 months and some for more than one year and still being curable at elevated temperatures.

The product of the method described herein is a complex mixture of various reacted and unreacted siloxane molecules with acetylenic alcohols and also contain platinum in a catalytic form, where the product provides a crosslinking function, a catalytic function and an inhibitor function for platinum at room temperature. This product can be used to make heat curable compositions which are storable at room temperature in a single package containing a combination of aliphatically unsaturated siloxane polymer and the reaction product which functions as a crosslinker, a catalyst and an inhibitor.

Curable compositions of this invention can be obtained by mixing (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, with (2) the crosslinker-platinum catalyst-inhibitor as described above.

Organosilicon compound (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl, and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer, mixture of copolymers, mixture of monomers and polymers, mixtures of monomers and copolymers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as

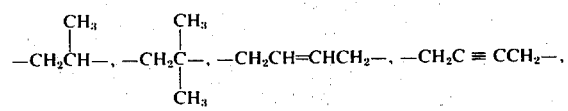

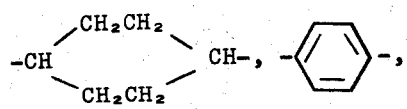

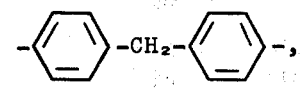

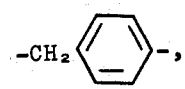

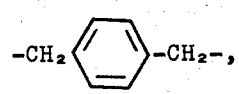

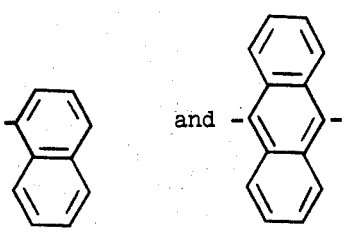

hydrocarbon ether radicals such as
—CH$_2$CH$_2$OCH$_2$CH$_2$—, —CH$_2$CH$_2$CH$_2$OCH$_2$CH$_2$— and

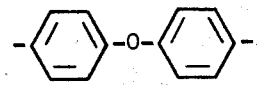

and haloarylene radicals such as

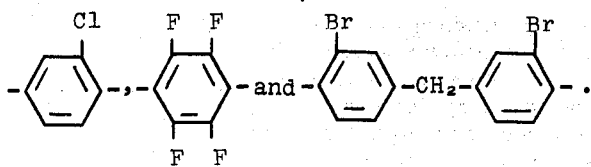

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages by oxygen. This is not necessary, however, particularly when component (1) is a cyclic material.

Preparation of materials that can be component (1) are well known in the art. The monovalent radicals can be attached, for instance, by either the so-called "direct process," or via Grignard reaction, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy), as is well known in the art. Divalent organic radicals can be introduced via Wurtztype synthesis, Grignard, direct process, etc. The preparations of compounds suitable for use as component (1) are well known in the art and need not be recited herein.

The selection of components (1) and (2) is somewhat interrelated. When the average number of aliphatically unsaturated groups per molecule in component (1) is 2.0, a component (2) should be selected wherein the average number of silicon-bonded hydrogen atoms per molecule is at least 2.0, so that the total of these just defined quantities is at least 4. The analogous is true when the chosen component (2) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 1.5. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too highly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

From the foregoing discussion it is apparent that some of the silicon-bonded-hydrogen atoms have reacted, however, the number of these hydrogen atoms which have undergone reaction are relatively small and for determining the ratio of silicon-bonded-hydrogen atoms to aliphatic unsaturated radicals in (1), one can disregard any loss of silicon-bonded hydrogen atoms due to reaction in the preparation of the crosslinker-platinum catalyst-inhibitor composition.

Compositions prepared from (1) and (2) can be stored for use at a later time. Such compositions are those suggested above which are stable over extended periods of time. Other compositions can be prepared wherein shortened pot life is required, such as where (1) and (2) are mixed and then used within a short period of time such as from 1 hour to a month. In this latter situation (2) is used primarily to slow the reaction at room temperature.

The curing reaction is that of addition of an SiH of (2) to an unsaturated radical on silicon of (1). This is a well-known reaction, catalyzed by many other materials in addition to platinum. The addition of SiH to allyl on silicon serves to illustrate the reaction as follows:

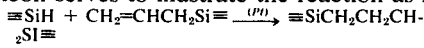

It is noteworthy that no byproducts are formed in the curing reaction. Thus, it is not necessary to cure the system under pressure as is the case when a curing system produces byproducts which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as fillers carbon black, silica aerogels, silica soots, treated silicas, alumina, clays, metal oxides, metal carbonates, metal silicates, etc., pigments to impart certain colors to the material, rubber additives such as compression set aids, plasticizers including both organosilicon and organic, etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70°C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH- unsaturated aliphatic-on-silicon room temperature cure.

Particularly useful curable organosilicon compositions for many of the above uses are those having 45 to 75 inclusive weight percent of (1), 0.5 to 10 inclusive weight percent of (2), 20 to 50 inclusive weight percent of a filler, where the weight percentages are based on the combined weights of (1), (2) and filler.

Because the crosslinker-platinum catalystinhibitor cannot be separated into various components by practical means, the composition is used as prepared by the method described herein. Thus, for any specific organosilicon polymer (1), the required or desired amount of platinum catalyst and siloxane having an average of at least three silicon-bonded-hydrogen atoms per molecule must be present when preparing the crosslinker-platinum catalyst-inhibitor. Adding any significant amount of either crosslinker having SiH or platinum catalyst upsets the property of inhibition and one looses the advantages gained by preparing this type of heat curing composition. Additional acetylenic alcohol or other platinum catalyst inhibitors could be added to the curable compositions, but no apparent advantages appear to be gained and all the disadvantages of other inhibitors or the wrinkling problem of acetylenic alcohol would be observed.

The following examples are illustrative only and should not be construed as limiting the present invention which is properly delineated in the claims.

EXAMPLE 1

The ingredients defined in Table I were mixed by combining the 3-methyl-1-butyn-3-ol with the siloxane and then adding the platinum catalyst. This mixture was placed in tightly capped bottles and heated at 70°C. for 16 hours. The resulting product was then stripped at reduced pressure of from 711.2 to 736.6 millimeters of mercury (28 to 29 inches of mercury) for the hours indicated in Table I at room temperature. The siloxane was a copolymer having trimethylsiloxy endblocking, an average of three dimethylsiloxane units per molecule, an average of five methylhydrogensiloxane units per molecule and an average of ten total siloxane units per molecule. The platinum catalyst was a mixture prepared by heating a mixture of chloroplatinic acid, a mixture of ester and alcohol solvent, symmetrical tetramethyldisiloxane and symmetrical divinyltetramethyldisiloxane containing about 0.4 weight percent platinum. The percentages in Table I are by weight based on the total mixture and the "ppm" of platinum is parts by weight platinum per one million parts by weight total mixture. The resulting products were crosslinker-platinum catalyst-inhibitor compositions.

TABLE I

| Composition Ref. | % Siloxane | % 3-methyl-1-butyn-3-ol | platinum, ppm | Hours, Stripped |
|---|---|---|---|---|
| A.* | 99 | 0.7 | 13.8 | 16 |
| B. | 98 | 1.4 | 27.2 | 16 |
| C. | 96 | 2.7 | 53.3 | 16 |
| D. | 92.3 | 5.1 | 102.6 | 16 |
| E. | 85.7 | 9.5 | 190.5 | 16 |
| F. | 98.6 | 0.7 | 27.4 | 16 |
| G. | 97.3 | 1.4 | 54 | 16 |
| H. | 94.7 | 2.6 | 105.3 | 16 |
| I. | 95.7 | 1.4 | 114.8 | 12 |
| J. | 95.2 | 1.9 | 114.3 | 12 |
| K. | 94.8 | 2.4 | 113.7 | 12 |
| L. | 94.3 | 2.8 | 113.2 | 12 |
| M. | 93.9 | 3.3 | 112.7 | 12 |
| N. | 93.5 | 3.7 | 112.2 | 12 |
| O. | 91.7 | 5.5 | 110.1 | 12 |

*Presented for comparative purposes only.

EXAMPLE 2

Curable compositions were prepared by mixing a base formulation with each of the crosslinker-platinum catalyst-inhibitor compositions of Example 1 in amounts as defined in Table II. The base formulation was a mixture of 76.0 weight percent of methylphenylvinylsiloxy endblocked polydimethylsiloxane having a viscosity of about 400 centipoise at 25°C., 19.3 weight percent 5 micron quartz, 2.8 weight percent fume silica, 1.1 weight percent hydroxyl endblocked polyphenylmethylsiloxane fluid having about 4 weight percent hydroxyl radicals and 0.8 weight percent carbon black. One gram samples of each curable composition was placed in open aluminum weighing dishes and heated to various temperatures. Cure time was defined as the length of time for the mixture to form a coherent solid. No surface wrinkling in any of the cured compositions which cured to elastomers was observed.

TABLE II

| Crosslinker-Platinum Catalyst-Inhibitor Composition of Example 1 — Grams Used | Base Formulation Grams | Cure Times at 150°C., minutes | at 100°C., minutes | at 70°C., hours | at 50°C., hours | at 100°F days | at 25°C., days |
|---|---|---|---|---|---|---|---|
| A. | 2 | 30 | DID NOT | — | — | — | — | — |
| B. | 2 | 30 | 3.5 | — | — | — | — | — |
| C. | 2 | 30 | 1.5 | — | — | — | — | — |
| D. | 2 | 30 | 1.5 | — | — | — | — | — |
| E. | 2 | 30 | 1.0 | — | — | — | — | — |
| F. | 2 | 30 | 2.75 | — | — | — | — | — |
| G. | 2 | 30 | 1.25 | — | — | — | — | — |
| H. | 2 | 30 | 1.0 | 18 | — | — | — | — |
| I. | 26 | 400 | 1.0 | 12 | 3.0 | 18 | 2.50 | 17 |
| J. | 26 | 400 | 1.0 | 15 | 3.5 | 21 | 3.00 | 25 |
| K. | 26 | 400 | 1.25 | 19 | 4.0 | 26 | 3.3 | 30 |
| L. | 26 | 400 | 1.25 | 23 | 4.5 | — | 4.25 | 49 |
| M. | 26 | 400 | 1.25 | 28 | 5.0 | 48 | 6.67 | 77 |
| N. | 26 | 400 | 1.25 | 30 | 9.0 | 84 | 13.00 | >365 |

TABLE II-continued

| Curable Composition Crosslinker-Platinum Catalyst-Inhibitor Composition of Example 1 — Grams Used | Base Formulation Grams | Cure Times | | | | | |
|---|---|---|---|---|---|---|---|
| | | at 150°C., minutes | at 100°C., minutes | at 70°C., hours | at 50°C., hours | at 100°F days | at 25°C., days |
| O. 26 | 400 | 2.5 | 60 | 26.0 | 240 | 37.00 | >365 |

EXAMPLE 3

Mixtures as described in Example 1, A through E were reproduced except the mixtures were only heated for three hours instead of 16 hours. Curable compositions were then prepared by mixing 30 grams of the base formulation as defined in Example 2 with 2 grams of each resulting product. The composition corresponding to A of Example 2 did not cure when heated for 25 minutes at 150°C. The composition corresponding to B of Example 2 cured with no surface wrinkling in 6 minutes at 150°C. The compositions corresponding to C, D and E of Example 2 cured in 4 minutes at 150°C. with surface wrinkling, in 7 minutes at 150°C. with severe surface wrinkling and in 7.5 minutes at 150°C. with very severe surface wrinkling, respectively. The cured materials were elastomers.

EXAMPLE 4

The crosslinker-platinum catalyst-inhibitor composition prepared as described in Example 1, H. was used to determine the effect of stripping the unreacted 3-methyl-1-butyn-3-ol from the reaction product. Curable compositions were prepared by mixing 30 grams of base formulation with 2 grams of crosslinker-platinum catalyst-inhibitor composition. The crosslinker composition was used, as initially prepared without stripping to remove the unreacted alcohol, to make the curable composition. The cure times were observed by heating 1 gram samples in an open aluminum dish at 150°C. and 100°C. The curable compositions cured in 2.75 minutes at 150°C. and 80 minutes at 100°C. Two other samples of curable composition were allowed to set at room temperature in the open aluminum dishes for 6 days and 14 days before heating the samples to determine cure times. Cure times of 2 minutes at 150°C. and 60 minutes at 100°C. were observed for the sample with 6 days open exposure and cure times of 2 minutes at 150°C. and 45 minutes at 100°C. were observed for the sample with 14 days open exposure. After stripping to remove the unreacted alcohol as defined in Example 1, curable compositions were prepared and the cure times were observed initially and after open exposure for 1 day, 5 days and 13 days. Each sample cured in one minute at 150°C. and between 16 and 18 minutes at 100°C. regardless of the length of exposure, thus it was demonstrated that the removal of unreacted 3-methyl-1-butyn-3-ol stabilized the curable composition regardless of the amount of open exposure and therefore was non-volatile. The cured materials were elastomers without evidence of surface wrinkling.

EXAMPLE 5

Crosslinker-platinum catalyst-inhibitor compositions were prepared as described in Example 1 except the platinum catalyst was prepared by mixing chloroplatinic acid hexahydrate and symmetrical divinyltetramethyldisiloxane to provide a platinum catalyst having about 0.65 weight percent platinum. This platinum catalyst was prepared by the method described in U.S. Pat. No. 3,419,593 which is hereby incorporated by reference to show the preparation of the platinum catalyst. The amounts of ingredients used were as shown in Table III. The reaction product was stripped for 16 hours as described in Example 1.

TABLE III

| Composition Ref. | % Siloxane | % 3-methyl-1-butyn-3-ol | Platinum, ppm. |
|---|---|---|---|
| A. | 93.9 | 5.6 | 30.5 |
| B. | 93.5 | 5.6 | 60.8 |
| C. | 92.6 | 5.6 | 120.4 |
| D. | 91.7 | 5.5 | 178.9 |
| E.** | 91.7 | 5.5 | 110.1 |

**The same platinum catalyst as described in Example 1 was used for comparison.

Curable compositions were prepared by mixing 400 grams of base formulation with 26 grams of each of the crosslinker-platinum catalyst-inhibitor compositions defined by Table III. The base formulation was 100 parts by weight of a methylphenylvinylsiloxy endblocked polydimethylsiloxane having a viscosity of about 400 centipoise at 25°C. and 100 parts by weight 5 micron quartz. The cure times were determined on 2 gram samples as described in Example 2 and were as shown in Table IV. Each curable composition prepared is identified by the Composition Ref. of the crosslinker-platinum catalyst-inhibitor composition of Table III. The cured materials were elastomers which were free of surface wrinkling.

TABLE IV

| Reference | Cure Times | | | | |
|---|---|---|---|---|---|
| | at 100°C., min. | at 70°C., hours | at 50°C., days | at 37.8°C. (100°F.) days | at 25°C., days |
| A. | 31 | 8.50 | 2.33 | 11.00 | >120 |
| B. | 23 | 6.75 | 1.39 | 6.00 | >120 |
| C. | 19 | 4.25 | 1.25 | 4.08 | 77 |
| D. | 15 | 3.00 | 1.04 | 3.33 | 61 |
| E. | 28 | 7.25 | 2.00 | 7.29 | >120 |

EXAMPLE 6

A crosslinker-platinum catalyst-inhibitor composition was prepared as described in Example 1 using the platinum catalyst as described in Example 5. The amounts of ingredients used were 92% siloxane, 7.4% 3-methyl-1-butyn-3-ol and 44.8 ppm platinum. The reaction product was split into two parts with one part stripped for 20 hours and the other part stripped for 40 hours. Curable compositions were prepared as described in Example 5 for each stripped crosslinker composition. Cure times were determined on two gram samples for each. Also determined were skin-over-time and time for complete cure for one pint (0.473 liters) samples. Skin-over-time was the time required at a specified temperature for a cured skin to form on the surface of the sample. Time for complete cure was the time required at a specified temperature for the entire sample to become a coherent solids. The results of the cure times for the 2 gram samples were as shown in Table V and the results of the skin-over-times and time for complete cure were as shown in Table VI. Both stripping times gave elastomers from the curable composition which did not show surface wrinkling, thus some small amount of unreacted 3-methyl-1-butyn-3-ol can be tolerated.

TABLE V

| Cure Temperature, °C. | Cure Time, 20 hour Strip | Cure Time, 40 hour Strip |
|---|---|---|
| 150 | 2 minutes | 1.25 minutes |
| 100 | 60 minutes | 30 minutes |
| 70 | 9.5 hours | 7 hours |
| 50 | 9 days | 5.56 days |
| 37.8 | 19 days | 17 days |
| 25 | >90 days | >90 days |

TABLE VI

| Cure Temperature, °C. | Skin-over-time 20 hour Strip | Skin-over-time 40 hour Strip | Time for Complete Cure, 20 hour Strip | Time for Complete Cure, 40 hour Strip |
|---|---|---|---|---|
| 150 | 15 minutes | 10 minutes | 45 minutes | 30 minutes |
| 100 | 4 hours | 2 hours | 9 hours | 4 hours |
| 70 | 2 days | 1 day | 9 days | 9 days |
| 50 | 20 days | 15 days | — | — |
| 37.8 | — | 28 days | — | — |
| 25 | >90 days | >90 days | — | — |

EXAMPLE 7

In this example, the elimination of the stripping step is illustrated and the usefulness of the resulting products shown.

In one capped container, 300 grams of a siloxane copolymer as defined in Example 1 and in another capped container a mixture of 10.5 grams of a platinum catalyst as defined in Example 5 and an amount of 3-methyl-1-butyn-3-ol as defined in Table VII, were heated to 70°C. The contents of the two containers were then mixed and heated in a capped container for 20 hours at 70°C. to produce a crosslinker-platinum catalyst-inhibitor composition. Curable compositions were prepared by thoroughly mixing crosslinker-platinum catalyst-inhibitor compositions with a base formulation as defined in Example 5 in amounts as shown in Table VII. Cure times were determined on 2 gram samples and on one pint samples. Skin-over-times were also determined on one pint samples. These cure times and skin-over-times were determined at various temperatures by placing the samples in an oven. The surface was observed for wrinkling. These properties were as shown in Tables VIII, IX and X.

TABLE VII

| | | Curable Compositions | |
|---|---|---|---|
| Ref. No. | 3-methyl-1-butyn-3-ol, grams | Base Formulation, grams | Crosslinker-Platinum Catalyst Composition, grams |
| 1 | 50 | 93.5 | 6.5 |
| 2 | 40 | 375 | 25 |
| 3 | 30 | 375 | 25 |
| 4 | 20 | 375 | 25 |
| 5 | 10* | — | — |

*Gelled on heating on 70°C.

TABLE VIII

| | Cure Time, 2 gram samples | | | | |
|---|---|---|---|---|---|
| Ref. No. | at 150°C., minutes | at 100°C., minutes | at 70°C., hours | at 50°C., days | at 37.8°C., days | at RT** days |
| 1 | 1.5 | 50 | 19 | 5 | 26 | >150 |
| 2 | 1.25 | 40 | 22 | 2.5 | 16 | 150 |
| 3 | 1.25 | 24 | 8 | 2.1 | 11 | 84 |
| 4 | 1.0 | 10 | 5.5 | 1.2 | 5 | 33 |

**RT is room temperature.

TABLE IX

| | Cure Times, One Pint Samples | | | | |
|---|---|---|---|---|---|
| Ref. No. | at 150°C., minutes | at 100°C., hours | at 70°C., days | at 50°C., days | at 37.8°C., days |
| 1 | 40[1] | 6[3] | 16[4] | 40[4] | — |
| 2 | 35[1] | 2.5[2] | 11[4] | 32[4] | — |
| 3 | 30[1] | 1.7[1] | 2[2] | 24[3] | 70 |
| 4 | 25[1] | 1.0[1] | 0.8[1] | 4[1] | 14[1] |

[1]No surface wrinkling
[2]Very slight surface wrinkling
[3]Slight surface wrinkling
[4]Severe surface wrinkling

TABLE X

| Ref. No. | Skin-Over-Time, One Pint Sample | | | | | |
|---|---|---|---|---|---|---|
| | at 150°C., minutes | at 100°C., minutes | at 70°C., hours | at 50°C., days | at 37.8°C., days | at RT days |
| 1 | 10 | 80 | 40 | 8 | 45 | — |
| 2 | 12 | 110 | 24 | 6 | 31 | — |
| 3 | 9 | 65 | 16 | 6 | 20 | — |
| 4 | 6 | 35 | 6 | 1.5 | 7 | 47 |

That which is claimed is:

1. A method of preparing a crosslinker-platinum catalyst-inhibitor composition comprising mixing a siloxane having an average of at least three silicon-bonded hydrogen atoms per molecule, an acetylenic alcohol and a platinum catalyst to form a mixture, heating the mixture in a closed system for 10 to 30 hours at a temperature of from 50°C. to 90°C. and thereafter removing unreacted acetylenic alcohol by applying a reduced pressure of 700 to 750 millimeters of mercury for at least 10 hours at a temperature of from 20°C. to 30°C., said siloxane having an average of at least three silicon-bonded hydrogen atoms per molecule, there being in addition an average of up to two monovalent organic radicals per silicon atom selected from the group consisting of monovalent hydrocarbon radicals free of aliphatic unsaturation and monovalent fluorinated hydrocarbon radicals free of aliphatic unsaturation, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent fluorinated arylene radicals wherein at least one divalent radical is a divalent oxygen atom and said divalent radicals linking silicon atoms, said siloxane being liquid at a temperature of 50°C. to 90°C. in said mixture, said acetylenic alcohol having a vapor pressure sufficient to be removed from the mixture after the heating step at the temperature and pressure specified for the removal of unreacted acetylenic alcohol.

2. The crosslinker-platinum catalyst-inhibitor composition prepared by the method of claim 1.

3. The method in accordance with claim 1 in which the siloxane is a copolymer having an average of at least two trimethylsiloxy units, three dimethylsiloxane units and five methylhydrogensiloxane units, the acetylenic alcohol is 3-methyl-1-butyn-3-ol and the platinum catalyst is soluble in the mixture.

4. The crosslinker-platinum catalyst-inhibitor composition prepared by the method of claim 3.

5. A curable composition comprising
1. an organosilicon polymer having an average of from one to three groups per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, and
2. the crosslinker-platinum catalyst-inhibitor composition prepared by the method of claim 1.

6. A curable composition comprising
1. an organosilicon polymer having an average of from one to three groups per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, and
2. the crosslinker-platinum catalyst-inhibitor composition prepared by the method of claim 3.

7. The curable composition according to claim 5 wherein (1) is a triorganosiloxy-endblocked polydiorganosiloxane having a viscosity of at least 100 cs. at 25°C.

8. The curable composition according to claim 7 wherein the radicals of (1) are methyl and vinyl.

9. The curable composition according to claim 6 wherein (1) is a triorganosiloxy-endblocked polydiorganosiloxane having a viscosity of at least 100 cs. at 25°C.

10. The curable composition according to claim 9 wherein the radicals of (1) are methyl and vinyl.

11. A method of preparing a crosslinker-platinum catalyst-inhibitor composition comprising mixing a siloxane having an average of at least three silicon-bonded hydrogen atoms per molecule, an acetylenic alcohol and a platinum catalyst to form a mixture, heating the mixture in a closed system for 10 to 30 hours at a temperature of from 50°C. to 90°C., said siloxane having an average of at least three silicon-bonded hydrogen atoms per molecule, there being in addition an average of up to two monovalent organic radicals per silicon atom selected from the group consisting of monovalent hydrocarbon radicals free of aliphatic unsaturation and monovalent fluorinated hydrocarbon radicals free of aliphatic unsaturation, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent fluorinated arylene radicals wherein at least one divalent radical is a divalent oxygen atom and said divalent radicals linking silicon atoms, said siloxane being liquid at a temperature of 50°C. to 90°C. in said mixture.

12. The crosslinker-platinum catalyst-inhibitor composition prepared by the method of claim 11.

13. The method in accordance with claim 11 in which the siloxane is a copolymer having an average of at least two trimethylsiloxy units, three dimethylsiloxane units and five methylhydrogensiloxane units, the acetylenic alcohol is 3-methyl-1-butyn-3-ol and the platinum catalyst is soluble in the mixture.

14. The crosslinker-platinum catalyst-inhibitor composition prepared by the method of claim 13.

15. A curable composition comprising
   1. an organosilicon polymer having an average of from one to three groups per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, and
   2. the crosslinker-platinum catalyst-inhibitor composition prepared by the method of claim 11 wherein the amount of acetylenic alcohol is present in an amount sufficient to retard cure at room temperature and minimize surface wrinkling upon cure.

16. A curable composition comprising
   1. an organosilicon polymer having an average of from one to three groups per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon polymer being satisfied by divalent radicals selected from the group consisting of divalent oxygen atoms, divalent hydrocarbon radicals, divalent hydrocarbon ether radicals and divalent haloarylene radicals, said divalent radicals linking silicon atoms, and
   2. the crosslinker-platinum catalyst-inhibitor composition prepared by the method of claim 13 wherein the amount of acetylenic alcohol is present in an amount sufficient to retard cure at room temperature and minimize surface wrinkling upon cure.

17. The curable composition according to claim 15 wherein (1) is a triorganosiloxy-endblocked polydiorganosiloxane having a viscosity of at least 100 cs. at 25°C.

18. The curable composition according to claim 17 wherein the radicals of (1) are methyl and vinyl.

19. The curable composition according to claim 16 wherein (1) is a triorganosiloxy-endblocked polydiorganosiloxane having a viscosity of at least 100 cs. at 25°C.

20. The curable composition according to claim 19 wherein the radicals of (1) are methyl and vinyl.

* * * * *

UNITED STATES PATENT AND TRADEMARK OFFICE
CERTIFICATE OF CORRECTION

PATENT NO. : 3,989,666
DATED : November 2, 1976
INVENTOR(S) : Randolph G. Niemi

It is certified that error appears in the above-identified patent and that said Letters Patent are hereby corrected as shown below:

In Column 3, line 50; the formula reading " 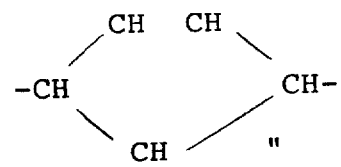

. should read " 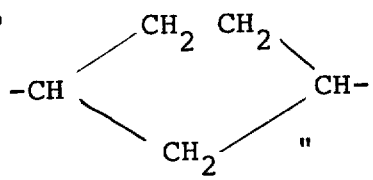 "

In Column 5, line 16; the line reading "tained by mixing(1) an organosilicon polymer having" should read "tained by mixing (1) an organosilicon polymer having"

In Column 7, line 15; the line reading "divalent linkages by oxygen. This is not necessary, how-" should read "divalent linkages be oxygen. This is not necessary, how-"

UNITED STATES PATENT AND TRADEMARK OFFICE
CERTIFICATE OF CORRECTION

PATENT NO. : 3,989,666
DATED : November 2, 1976
INVENTOR(S) : Randolph G. Niemi

It is certified that error appears in the above-identified patent and that said Letters Patent are hereby corrected as shown below:

In Column 9, line 4; the line reading "Because the cross-linker-platinum catalystinhibitor" should read "Because the crosslinker-platinum catalyst-inhibitor"

In Column 10, line 59; in Table II, under Column Heading reading " at 150°C., minutes DID NOT" should read " at 150°C., minutes DID NOT CURE"

In Column 13, line 8; the line reading "sample to become a coherent solids. The results of the" should read "sample to become a coherent solid. The results of the"

Signed and Sealed this

Twenty-sixth Day of January 1982

[SEAL]

Attest:

GERALD J. MOSSINGHOFF

Attesting Officer

Commissioner of Patents and Trademarks